June 2, 1964 H. P. SANTEE 3,135,326
SECONDARY OIL RECOVERY METHOD
Filed Nov. 21, 1960 2 Sheets-Sheet 2
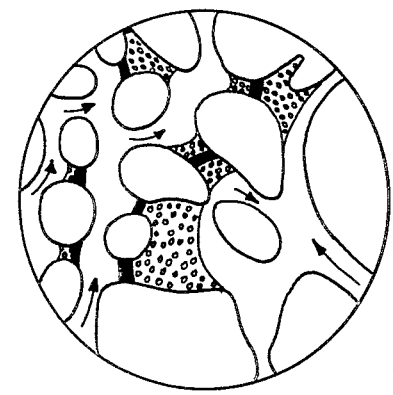
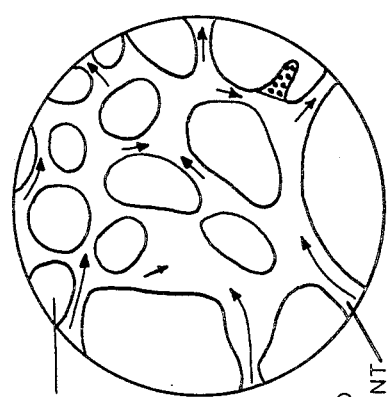
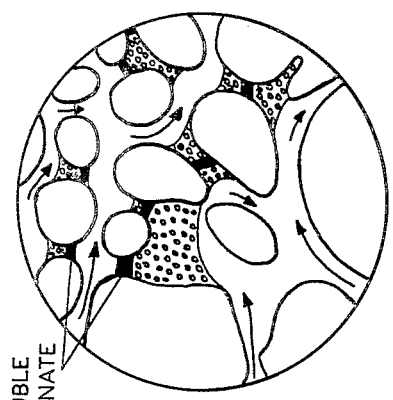
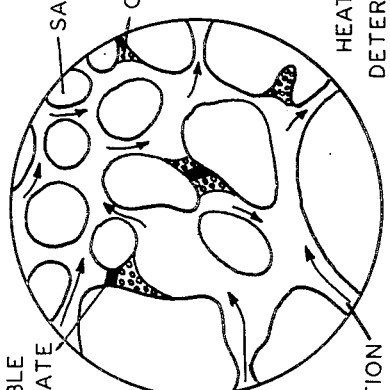
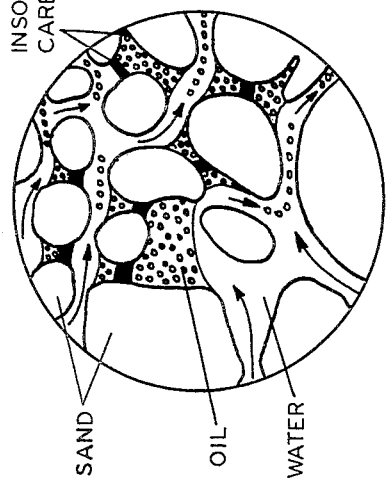
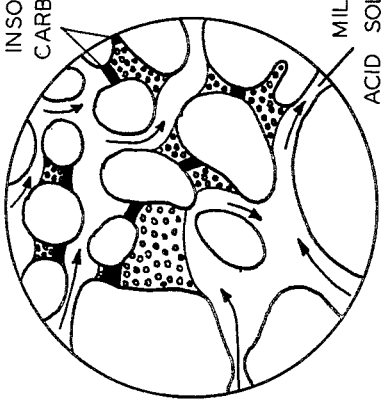
FIG. 2
FIG. 3
INVENTOR.
HAROLD P. SANTEE
BY
*Head & Johnson*
ATTORNEYS

United States Patent Office

3,135,326
Patented June 2, 1964

3,135,326
SECONDARY OIL RECOVERY METHOD
Harold P. Santee, Skiatook, Okla., assignor, by direct and mesne assignments, to Oil Sand Conditioning Corporation, Tulsa, Okla., a corporation of Oklahoma
Filed Nov. 21, 1960, Ser. No. 70,485
7 Claims. (Cl. 166—9)

This invention relates to a method of producing oil from subterranean formations. More particularly the invention relates to a drive process wherein the oil and its containing formation are treated prior to the injection of water which removes the oil from the formation to a production system.

The sciences of palentology and geology have advanced the theory that a rather dense gas of carbon dioxide enveloped the earth in its beginning and early infancy. This hypothesis appears to have substantial support from the continued analysis of the mineral content that makes up the sedimentary beds that form the earth's crust. These analyses show two broadly classified compounds. These are silicon dioxide and the carbonates of base forming metals and/or the alkaline earth metals. Further evidence under the hypothesis indicates that all elements were originally created through mutation from a common substance. Accordingly, the first chemical reaction of these atomic compounds would be their oxidation. Continuing, the next step would be continued reaction with the carbon dioxide to form carbonates. For example, it is a well known simple reaction that calcium oxide and carbon dioxide form the insoluble carbonate of calcium. Further reaction with an excess of carbon dioxide forms soluble calcium bicarbonate. This form remains until its deposition is effected by evaporation of the liquid vehicle. Such evaporation is typical of that which occurred on beaches and sand bars of the ancient seas. The evaporation decomposes the bicarbonates by release of $CO_2$ and reverts them to the insoluble carbonate form. The analysis of oil well cores, in fact, shows the matrix or cementitious material of the rock to be these insoluble carbonates. In some instances this carbonaceous matrix amounts to as much as 50% of the formation bulk. This invention concerns a method of recovering oil from such carbonaceous deposits.

Of current interest, is the production of oil from underground oil-bearing formations by what is termed "secondary recovery methods." Such methods are typically instituted after a primary production program which generally speaking leaves a great deal of residual oil in place. This unrecovered oil is caused by many factors including, the formation characteristics, the changing physical characteristics of the hydrocarbons, improper well completion and operating techniques and/or the loss or dissipation of the natural hydrocarbon propelling force. Accordingly, secondary recovery techniques have been developed in an attempt to recover the remaining oil which would otherwise have been lost. Typically, secondary recovery techniques require a force to propel the fluids within the formation from an injection well to a producing well. In some instances single well injection production methods have been proposed, and is to be included within the scope of this invention.

Water drive or water flooding is the most widely used secondary recovery technique. Here, residual oil is recovered by injecting water into one or a series of wells where it is forced radially and/or horizontally toward one or more producing wells, driving the oil ahead.

Although a water drive process has certain economic advantages over other types of recovery processes, there are certain disadvantages which necessitate a great deal of effort and expense. These unfavorable aspects typically are related to the physical characteristics of the oil, the permeability and porosity and type of formation, etc. Additionally, channeling or gravity segregation of the water interfers with efficient displacement of oil from large sections of the formation.

Accordingly, it is a primary object of the invention to provide a method of primary or secondary oil recovery which overcomes the problems associated with prior recovery methods and in which a greater portion of residual oil is recovered.

An additional object of this invention is to provide a method of oil recovery wherein the oil and its containing formation are treated prior to an effective drive process.

An additional object of this invention is to provide a process for the recovery of oil from subterranean formations wherein the formation and the oil therein are chemically and physically treated to obtain maximum recovery of the in place oil, and to further provide a relatively slow movement of the drive process, i.e., without excess surface pressure, from an injection well to a producing well whereby said chemical and physical treatment will have sufficient time to react with the oil and formation.

It is a further object of this invention to provide an improved method of oil recovery by a water drive.

A still further object of this invention is to provide a method of recovering relatively high viscosity oil without by-pass and channeling of the drive fluid.

A yet still further object of this invention is to provide a method of oil recovery from formations of restricted permeability and porosity.

These and other objects of this invention will become more apparent upon reading of the specification and claims when taken in conjunction with the following illustrations:

FIGURES 2 and 3 are diagrammatic illustrations taken from actual core tests of a conventional water drive (FIGURE 2) and the drive process of this invention (FIGURE 3).

Figure 1:
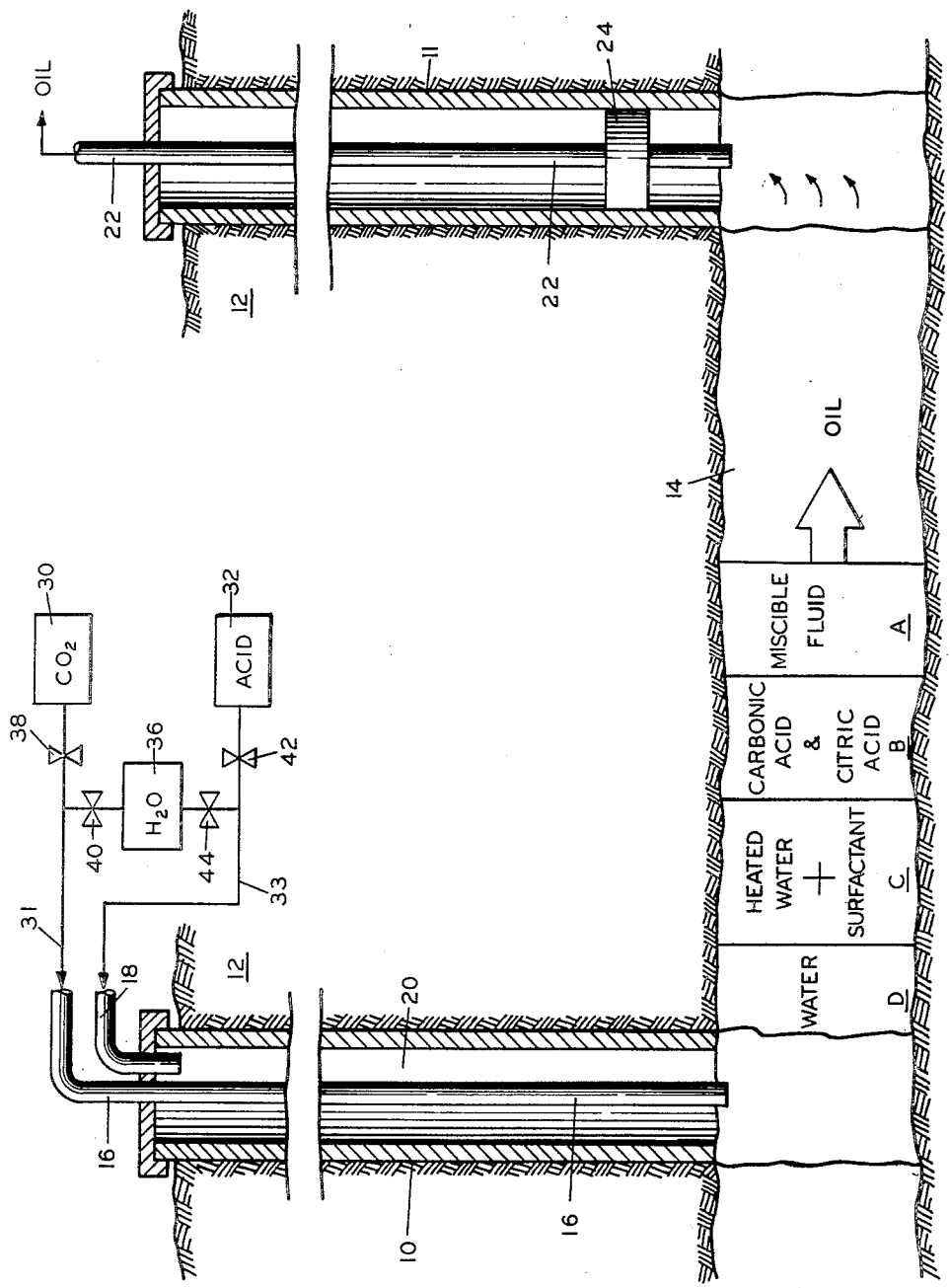
FIGURE 1 is a schematic drawing which shows a broken vertical section through an oil-bearing formation penetrated by wells and describing the method in accordance with this invention.

This invention concerns a process applicable to oil-bearing formations which are typically penetrated by an injection well 10 and a production well 11 as cased, cemented and/or completed in a well known manner. The injection well 10 includes a first injection tubing 16 extending from the surface to a point at or adjacent the subterranean formation 14. An additional injection conduit 18 connects the surface equipment hereinafter described with the annulus space 20 between the casing and tubing 16. Similarly in the production well, tubing 22 is provided to make connection between the oil-bearing formation 14 and the surface separating equipment, not shown. In some instances a packer 24 is used to confine flow of produced fluids into the tubing. In those instances where flow pressure is insufficient to provide natural flow through the production tubing 22 to the surface, a mechanical lifting means, such as are well known in the art, may be provided.

The surface equipment used with the method of this invention is schematically described and positioned with respect to the injection well 10 and conduits 16 and 18. Carbon dioxide in gaseous form is supplied from container 30, through supply conduits 31 and 16. Mild acids such as citric and/or oxalic are supplied from container 32 through conduit 33 to injection tubing 18. A source of water 36 is adapted for injection into either tubing 16 or 18 according to the position of valves 40 and 44.

The drive process of this invention specifically includes the injection of successive banks of treating fluids and are represented as A, B, and C. Bank D represents the propelling fluid, typically water.

(A) MISCIBLE FLUID BANK

The oil within a subterranean formation 14 represents a resistance to the driving fluids, especially when the oil viscosity is relatively high. According to this invention, a bank of miscible fluid A is first slowly injected into the formation to contact the oil creating a solvent action to reduce the viscosity. A sufficient amount of miscible fluid is injected to cause a gradual reduction in the density gradient from that of the oil in place back to the following banks of fluid to be injected, i.e., water. Typical miscible fluids for this invention are those termed liquified petroleum gases (L.P.G.) such as butane, propane and/or fuel oil or diesel fuel oil. In some instances a solvent or a treated fluid that is compatible both with the reservoir oil and the subsequent water bank is preferred. For example, alcohol or fluids containing agents which have oil and water solubility characteristics are inclusive within the latter type.

The amount of miscible fluid to be injected depends to a large extent on the reservoir conditions which varies from well to well and field to field. Usually that amount in volume representing ½% of the residual oil within 100 feet radius of pay sand, as determined by standard core analysis, is injected as a sufficient quantity.

(B) WEAK ACID BANK

Immediately following the miscible fluid bank A is a chilled water solution containing weak acids. Preferably, one acid is that formed by causing $CO_2$ gas to go into solution with water forming carbonic acid. In addition thereto a mild acid such as citric or other organic acids such as oxalic or acetic is combined therewith. The presence of the latter mild acid is added for the purpose of causing increased disassociation of the $H_2$ ion and hence increasing the ability of the $CO_2$ to form and maintain carbonic acid ($H_2CO_3$) in the solution. The water used is preferably saline and deoxidized and is typical of those found readily available in the field from shallow formations. In use, a premixed solution of the latter acid is maintained at a temperature between 30° to 40° Fahrenheit (F.) and is pumped from container 32 through conduit 33 and valve 42 into the injection pipe 18 connected to the annulus of the injection well. Simultaneously therewith carbon dioxide $CO_2$ gas is passed through valve 38 and conduit 31 into tubing 16 where it is bubbled into the temperature controlled saline solution prior to its entry into the formation. The carbon dioxide gas is continuously fed into the chilled solution preferably in quantities not less than 16 cubic feet per cubic foot of solution at standard temperature and pressure conditions and at pressures of not to exceed 150 p.s.i.g. It has been found that in that instance where a relatively stable carbonate binder such as barium or magnesium is present within a formation that a relatively smaller quantity of carbon dioxide gas in solution is necessary, for example, not less than 12 cubic feet per cubic foot of solution at standard temperature and pressure conditions. On the other hand, a relatively unstable carbonate binder such as calcium carbonate requires a greater quantity in solution in order to revert the binder into its bicarbonate form and maintain it that form.

The carbon dioxide gas entering into solution forms a weak carbonic acid ($H_2CO_3$). The carbonic acid reacts with the formation carbonates to precipitate the bicarbonate or soluble form. Accordingly, the calcium and/or alkaline earth carbonates of most subterranean formations are reduced to a soluble form and as such are propelled along with the drive fluids. The use of a chilled solution of carbonic acid and deoxidizing acid, i.e., usually less than 40° Fahrenheit, permits the use of reduced pressures to maintain the acid solution and hence continuous dissolving action of the carbonate throughout the drive process. The carbonic acid and deoxidizing bank will be relatively large in extent and will be injected at that pressure the formation will naturally take fluids. This prevents pressure differentials tending to cause by-passing and channeling, and equalizes viscosity differentials between the driving and driven fluids. A sufficient bank of carbonic acid and citric acid is one that will permit complete bicarbonate precipitation from injection well to producing wall.

(C) HEATED WATER-SURFACTANT BANK

In some instances immediately following the carbonic acid bank a bank of a surface active agent in heated water is injected into the input well. In practice water at a temperature of 180° Fahrenheit is preferred. Typical of the surface active agents are those of the water soluble non-ionic type, which, in the final phases of the invention, assist in lowering the interfacial tension between the formation surfaces and oil which may cling thereto. The heat assists in removing that oil which tends to coagulate and cling to the sand surfaces.

(D) WATER DRIVE

After an injection of sufficient quantities of chemical reactants as described for banks A, B, and C a normal water flooding or water drive system is provided to carry the chemical banks radially and horizontally through the formation, forcing oil into the production well.

In the preferred embodiment of the invention the above described banks are permitted to drive through the formation. That is relatively high pressures are not used to drive the banks from injection well to production well. Instead, only that hydrostatic pressure existing within the injection well is permitted to effect immediate replacement of fluids as they move in the formation. Hence, the chemical reaction time of converting the normally insoluble carbonates to the soluble form is permitted to take place in situ without dilution or by-passing.

A typical example of the operation and use of the invention is best given by referring to actual laboratory and field tests.

LABORATORY TESTS

A standard analysis of a core section from an oil formation known as the "Bartlesville Sand" was made to provide information as to the type of formation, its porosity and permeability, percent of conate water and residual oil. Additional reservoir information includes oil viscosity and the recovery potential. Additionally the qualitative and quantitative analysis of the dissolved solids in the drive water and water to be used in the chemical process flood of this invention was made.

The standard core analysis resulted as follows:

| | | |
|---|---|---|
| Porosity | percent | 19.6 |
| Permeability | md | 22 |
| Oil | percent | 47 |
| Water (conate) | do | 38 |
| Oil | bbl./acre-foot | 715 |
| Water drive potential recovery | do | 285 |
| Calculated flood recovery | do | 145 |
| Residual oil | do | 440 |
| Viscosity | cps | 12 |
| Gravity | API | 31 |

The analyses of the available drive water are as follows:

| Mineral—p.p.m. | Arbuckle | Bartlesville |
| --- | --- | --- |
| Sodium | 48,522 | 50,362 |
| Calcium | 10,930 | 9,660 |
| Magnesium | 1,920 | 1,980 |
| $SO_4$ | 370 | Trace |
| Chloride | 101,495 | 102,380 |
| $HCO_3$ | 71 | 130 |
| Barium | Trace | 922 |
| Iron | 48 | 136 |
| pH Factor | 6.30 | 6.18 |

In establishing a comparison of an ordinary water drive with that of the chemical process drive of this invention, an unbroken three inch core eight inches long was obtained from the "Bartlesville Sand." Preparation of the core consisted of cutting two, three inch long sections from the large core wherein the sides were perpendicular to the ends. The two cores were drilled in the center using a ⅛ inch diamond tipped drill. The periphery of the core speciments was slotted vertically to form ⅛ inch wide and ⅛ inch deep slots 90° apart. The periphery between the slots was coated with a fast drying plastic compound. Both specimens were then tightly wrapped with six laps of 0.006 inch plastic sheeting. A solid sheet metal band was then clamped around the core. Rubber gaskets of ⅛ inch rubber sheeting were glued to the ends of each core and one core sample was then sealed in an air tight container and frozen.

A mixture of two parts of the Arbuckle brine and one part of Bartlesville brine was prepared in sufficient quantity for both tests. The pH factor of the resulting mixture was 6.21. The calculated pore space based on the laboratory core analysis was 68.04 cc.

274 cc. of the mixed brine was injected into the number 1 core specimen at a pressure of 30 p.s.i.g. At the completion of this injection a total of 6.72 cc. or 21% of the oil was recovered. Additional injection using 274 cc. of the mixed brine resulted in recovery of 2.46 cc. of additional oil or a net recovery of 28.7% of the in place oil. The total fluid injection was eight pore spaces and in the ratio of 17 barrels of injection fluid to one barrel of produced oil. The total recovery of fluids was 7.81 pore spaces.

Preparation for the tests upon the number 2 core sample consisted of dissolving the ratio of two and one-half pounds of critic acid crystals per one hundred barrels of brine mixture. Injection within the core was preceded by a miscible fluid bank totalling 1 cc. solution of 75% natural gasoline and 25% diesel oil. Following this 274 cc. of a chilled acid-brine mixture was injected, to which was added carbon dioxide gas in the ratio of 12 cubic feet of gas to one cubic foot of brine, at standard pressure and temperature conditions. The injection pressure was maintained at 30 p.s.i.g., although the carbon dioxide pressure was somewhat higher. The oil produced initially amounted to 20.5 cc. or 64.1% of the in-place oil. 274 cc. of a heated (180° F.) brine solution plus ½% by weight of a non-ionic detergent, of the type sold under the tradename Special Wetting Agent No. A–513 and manufactured by Aniline & Film Corp. was injected thereafter. This resulted in recovery of 5.72 cc. of oil or a total of 82% of the in-place oil recovered, after deducting the 1 cc. solution of light hydrocarbon. As in the number 1 sample, a total of eight pore spaces of fluid was injected with a recovery of 7.56 pore spaces. The pH factor of the recovered solution was 4.4. An analysis of the recovered acid solution showed approximately 89% of $BaSO_4$ in solution and 64% of $Ca(HCO_3)_2$ in solution indicating the effectiveness of the process.

At the completion of the two tests plugs from the specimens were analysed for standard information as to porosity, permeability, etc., with the results as follows:

*Specimen No. 1*

| Plug Location | Porosity (Percent) | Permeability (Millidarcys) |
| --- | --- | --- |
| 270°—Top | 18.9 | 28.0 |
| 270°—Bottom | 19.2 | 31.0 |
| Average | 19.05 | 29.5 |
| 225°—Center | 17.8 | 16.7 |
| 45°—Top | 17.6 | 14.8 |
| 45°—Bottom | 18.0 | 17.2 |
| Average | 17.8 | 16.0 |
| 90°—Center | 19.3 | 27.4 |

OVER-ALL AVERAGES

| | | |
| --- | --- | --- |
| 270°—Top | 18.9 | 28.0 |
| 270°—Bottom | 19.2 | 31.0 |
| 90°—Center | 19.3 | 27.4 |
| Averages | 19.1 | 28.8 |
| 225°—Center | 17.8 | 16.7 |
| 45°—Top | 17.6 | 14.8 |
| 45°—Bottom | 18.0 | 17.2 |
| Averages | 17.8 | 16.2 |

*Specimen No. 2*

| Plug Location | Porosity (Percent) | Permeability (Millidarcys) |
| --- | --- | --- |
| 270°—Top | 23.0 | 289.0 |
| 270°—Bottom | 24.1 | 314.0 |
| Average | 23.5 | 301.0 |
| 225°—Center | 21.3 | 247.6 |
| 45°—Top | 20.6 | 254.0 |
| 45°—Bottom | 21.0 | 363.0 |
| Average | 20.8 | 263.0 |
| 90°—Center | 24.6 | 422.0 |

OVER-ALL AVERAGES

| | | |
| --- | --- | --- |
| 270°—Top | 23.0 | 289.0 |
| 270°—Bottom | 24.1 | 314.0 |
| 90°—Center | 24.6 | 422.0 |
| Averages | 23.9 | 341.0 |
| 225°—Center | 21.3 | 247.6 |
| 45°—Top | 20.6 | 254.0 |
| 45°—Bottom | 21.0 | 363.0 |
| Averages | 20.9 | 288.0 |

In Specimen No. 1 it is to be noted that plugs 270°—top, 270°—bottom and 90°—center averaged 1.3% higher porosity than did plugs 225°—center, 45°—top and 45°—bottom, whereas the corresponding permeability in millidarcys rose 12.6 points. In comparing the averages of Specimen Number 1 to Specimen Number 2 the tabulation indicates an increase in the averages of 4.8% of porosity for those plugs that were taken at the effluent points, i.e., opposite the slot, and a very material increase in the permeability some 312.2 millidarcys at the same points of effluent. Those plugs that were taken 45° from the point of injection to the point of effluent showed an increase of 4.7% porosity and a permeability increase of 271.8 millidarcys for the Number 2 sample. Hence, there appeared to be a material increase in porosity and exceptional increases in permeability of the specimen tested in accordance with this invention, when compared to the original commercial analysis of the core sample. The theory of the invention as confirmed by an analysis of the resultant brines revealed a high percentage of sulfate and bicarbonate in solution.

The increased efficiency of the drive process of this invention is diagrammatically shown in FIGURES 2 and 3. The former illustrates why an ordinary water drive process fails to eliminate pockets and barriers such as the insoluble carbonate binder which entrap oil whereas the latter illustrates the chemical attack of the barriers to release the oil and permit flow of drive fluids. The views show the various stages, from left to right, of typical core analysis results. For example, in FIGURE 2, it is to be noted that the insoluble carbonate binder (indicated in solid black) is not dissolved or eliminated in an ordinary water drive process and instead supports capillary traps for oil.

Likewise, FIGURE 3 is a step by step analysis of typical cores using the process of this invention after passage of the miscible fluid and is largely to indicate the chemical attack provided by the chilled carbonic acid and citric acid bank. This chemical bank is not only adapted to eliminate the insoluble carbonate barriers but also is a driving fluid for removing the oil pockets formed therein.

FIELD TEST

Based on the above laboratory tests an actual field test of the process incorporated by this invention was conducted. The location for this test was southwest of Paola, Kansas.

*Well No. 1A*

A 1% solution of natural gasoline and number two diesel fuel was prepared in an amount based on the quantity of oil in the region to be invaded. The mixture was injected into a well that had been producing 19 gravity crude having viscosity well over 400 centipoises. Following the above first bank a prepared brine solution (three pounds of citric acid crystals per 100 barrels of brine) was injected into the well. Simultaneously therewith 14 cubic feet of carbon dioxide gas (at standard temperature-pressure conditions) per barrel was injected into the brine at or near the well opposite the formation to be treated. .63 barrel per foot of pay section was injected per day. At the end of six hours the natural take of the well had increased to approximately 2 barrels per foot per day. At the end of 24 hours the input had increased to 3 barrels per foot per day. A gradual increase of the injection intake occurred until 16 barrels per foot per day was encountered at which time the rate held steady.

*Well No. 1B*

Further tests were conducted in an off-setting well wherein the acid-brine solution was injected without the pre-injection of the miscible fluid, i.e., a straight acid water-drive. This well did not begin to take the acid-brine solution until the elapse of six days and then in small quantities. For example, the rateable take was observed to be .45 barrel per foot per day which had increased to .86 barrel per foot per day at the end of 24 hours. In one week the take had increased to 2 barrels per foot per day. The capacity for intake did not equal that of Well No. 1A until an elapse of sixty days' time.

*Well No. 2A*

An additional test of Bartlesville Sand was made on a lease south of Wellsville, Kansas having crude of 31 gravity and viscosity of 12 centipoises. A ½% solution of miscible fluid calculated on the basis of the in-place oil was injected prior to the acid-brine solution injection. The intake initially amounted to 1.24 barrels per foot per day. In six hours the intake had increased to 3½ barrels per foot per day without any pressure build up. In 24 hours the intake had increased to 8 barrels per foot per day and at the end of one week this was up to 20 barrels per foot per day at which time the intake was stabilized for a period of time.

*Well No. 2B*

An adjacent well had an acid-brine solution injected into the pay section without pre-introduction of the miscible fluid. The initial intake amounted to .73 barrel per foot per day which had increased at the end of 24 hours to 2½ barrels per foot per day and in one week to 12 barrels per foot per day with a gradual build up to 20 barrels per foot per day after the elapse of 40 days.

After calculated quantities of the acid-brine solutions had been injected in all of the above wells there followed a calculated quantity of straight brine solution which had been heated to 180° F. and including a one-half percent by weight non-ionic detergent. The results indicated that the wells having the miscible fluids pre-injected prior to the acid-brine solution produced 3% to 5% more oil with the heated detergent solution than those wells that did not have the miscible fluid injection.

Although this invention has been described with reference to specific and preferred embodiments, it will be apparent, however, that many modifications can be made without departing from the spirit and scope of this invention. For example one embodiment includes the injection into the formation of a single bank of a water solution of carbonic acid and citric acid followed by a driving fluid such as water. Accordingly, this invention should be considered not to be limited to the embodiments herein described, but should be limited only by the scope of the appended claims.

What is claimed is:

1. A method of oil recovery from subterranean formations penetrated by an injection well and a production well comprising the steps of sequentially injecting into said injection well; a first bank of fluid miscible with said oil to cause a gradual viscosity gradient between that of said oil and a second bank; said second bank comprising a water solution at a temperature between the range of 30–40° F. and containing carbon dioxide gas in an amount within the range of 12 to 20 cubic feet per cubic foot of said solution at standard conditions and further containing citric acid of at least .025 pound per barrel of said solution; a third bank of a water solution at a temperature between the range of 100° F. and 212° F. and containing a water soluble surfactant capable of reducing the interfacial tension between said formation and said oil; driving said banks from said injection well to said production well at a pressure of substantially the hydrostatic pressure existing in said injection well; and withdrawing oil from said production well.

2. A method of oil recovery from subterranean formations penetrated by an injection well and a production well comprising the steps of sequentially injecting into said injection well; a first bank of fluid miscible with said oil to cause a gradual viscosity gradient between that of said oil and a second bank; said second bank comprising a water solution at a temperature between the range of 30–40° F. and containing carbon dioxide gas in an amount within the range of 12 to 20 cubic feet per cubic foot of said solution at standard conditions and further containing citric acid of at least .025 pound per barrel of said solution; a third bank of a water solution at a temperature between the range of 100° F. and 212° F. and containing a water soluble surfactant capable of reducing the interfacial tension between said formation and said oil; driving said banks from said injection well to said production well using water; and withdrawing oil from the said production well.

3. A method of oil recovery from subterranean formations penetrated by an injection well and a production well comprising the steps of sequentially injecting into said injection well; a first bank of miscible fluid to cause a gradual viscosity gradient between said oil, and a second bank of a chilled water solution containing carbonic acid and a weak organic acid, a third bank of a water solution at a temperature substantially higher than said second bank, said solution containing an agent capable of lowering the interfacial tension between said oil and said formation; driving said banks from said injection well to said production well at a pressure of substantially the hydrostatic pressure existing in said injection well; and withdrawing oil from said production well.

4. A method according to claim 3 wherein said miscible fluid is an L.P.G.

5. A method according to claim 3 wherein said miscible fluid is diesel fuel oil.

6. A method according to claim 3 wherein said weak organic acid is citric acid.

7. A method according to claim 3 wherein said agent is a water soluble non-ionic surface active agent.

References Cited in the file of this patent

UNITED STATES PATENTS 2,875,831    Martin et al. _____ Mar. 3, 1959